US011525228B2

(12) United States Patent
Wendorff et al.

(10) Patent No.: US 11,525,228 B2
(45) Date of Patent: Dec. 13, 2022

(54) LIGHT SIGNALING SYSTEM (71) Applicants: Terry C. Wendorff, Slinger, WI (US);
Jacob R. Brehmer, Hartford, WI (US);
Timothy Koch, Slinger, WI (US)

(72) Inventors: Terry C. Wendorff, Slinger, WI (US);
Jacob R. Brehmer, Hartford, WI (US);
Timothy Koch, Slinger, WI (US)

(73) Assignee: Sno-Way International, Inc., Hartford, WI (US)

(*) Notice: Subject to any disclaimer, the term of this patent is extended or adjusted under 35 U.S.C. 154(b) by 154 days.

(21) Appl. No.: 16/934,952

(22) Filed: Jul. 21, 2020

(65) Prior Publication Data
US 2022/0025594 A1 Jan. 27, 2022

(51) Int. Cl.
B60Q 1/18 (2006.01)
E01H 5/06 (2006.01)
B60Q 1/26 (2006.01)
H05B 47/10 (2020.01)
H05B 47/16 (2020.01)
H05B 47/19 (2020.01)

(52) U.S. Cl.
CPC ............ E01H 5/066 (2013.01); B60Q 1/18 (2013.01); B60Q 1/2661 (2013.01); H05B 47/10 (2020.01); H05B 47/16 (2020.01); H05B 47/19 (2020.01)

(58) Field of Classification Search
CPC ........ E01H 5/066; B60Q 1/18; B60Q 1/2661; H05B 47/10; H05B 47/16; H05B 47/19
See application file for complete search history.

(56) References Cited

U.S. PATENT DOCUMENTS

| 5,420,480 | A | 5/1995 | Knepel et al. |
| 6,005,300 | A | 12/1999 | Kelly |
| 6,201,318 | B1 | 3/2001 | Guillory |
| 6,265,829 | B1 | 7/2001 | Perdec |
| 6,504,306 | B2 | 1/2003 | Menze |
| 7,137,724 | B2 | 11/2006 | Menze et al. |
| 7,400,058 | B1 | 7/2008 | Wayne et al. |
| 8,375,607 | B2 | 2/2013 | Menze |
| 9,194,091 | B2 | 11/2015 | Moon, Jr. et al. |
| 9,278,645 | B1 | 3/2016 | Orazem |
| 9,346,394 | B1 | 5/2016 | Orazem |
| 9,751,452 | B2 | 9/2017 | Orazem |
| 2002/0171291 | A1 | 11/2002 | Wayne et al. |
| 2006/0123668 | A1* | 6/2006 | Campanella ............ E01H 5/068 37/268 |
| 2008/0073090 | A1 | 3/2008 | Harris |
| 2012/0169232 | A1 | 7/2012 | Behr |
| 2016/0207447 | A1 | 7/2016 | Orazem |
| 2016/0207451 | A1 | 7/2016 | Orazem |
| 2016/0212829 | A1 | 7/2016 | Orazem |
| 2016/0319503 | A1* | 11/2016 | Westman ................. B60Q 1/32 |

(Continued)

Primary Examiner — Minh D A
(74) Attorney, Agent, or Firm — Reinhart Boerner Van Deuren P.C.

(57) ABSTRACT

A light signaling system for a vehicle having a vehicle lighting system and an auxiliary lighting system for use with an auxiliary device. The light signaling system includes a control module mounted to the vehicle. The control module is electrically coupled to one or more lights of the vehicle lighting system of the vehicle and to one or more lights of the auxiliary lighting system. The control module is configured to cause one or more lights, to which it is electrically coupled, to flash on and off.

17 Claims, 7 Drawing Sheets (56) References Cited

U.S. PATENT DOCUMENTS

2017/0066363 A1* 3/2017 Orazem ................. B60Q 1/076
2017/0349093 A1* 12/2017 Peacock ............... B60Q 1/0088
2017/0361766 A1 12/2017 Orazem

* cited by examiner

LIGHT SIGNALING SYSTEM

FIELD OF THE INVENTION

This invention generally relates to a light signaling system to alert drivers to the presence of a vehicle.

BACKGROUND OF THE INVENTION

Auxiliary devices mountable to automotive vehicles often have their own auxiliary lighting system. For example, one such auxiliary device is a snowplow. Snowplows are typically mounted to the front of automotive vehicles. However due to its overall size, the snowplow may obstruct the headlights of the vehicle. Obstruction of the headlights of the vehicle can prevent adequate light from illuminating the ground in front of the vehicle for the operator to properly see what is in front of the vehicle, and can prevent oncoming vehicles that are traveling toward the vehicle with the snowplow from properly seeing the vehicle or the snowplow. Furthermore, when the snowplow is positioned in front of the headlights, the light produced may be reflected back at the vehicle operator, making it more difficult to drive the vehicle. For this reason, auxiliary devices for trucks with snowplows will typically include an auxiliary lighting system such that the issues associated with obstructing or reflecting light from the vehicle is mitigated.

While the auxiliary lighting system can solve or mitigate the obstruction issues, it creates a new source of problems. Specifically, the lights of the auxiliary lighting system must include a means for control by the operator of the vehicle. Attempts have been made to create wiring harnesses that directly connect into the vehicle lighting system such that the power is directed to the vehicle lights, e.g. the vehicle headlights or vehicle marker lights, is directly sent to the auxiliary lighting system lights, e.g. auxiliary headlights or auxiliary marker lights. These wiring harnesses may be connected into connectors provided in the vehicle lighting system or may be directly spliced into the vehicle lighting system.

Unfortunately, as vehicles have become more sophisticated, directly connecting auxiliary lights into the vehicle lighting system in this manner may cause other problems. More particularly, many vehicle computers will monitor the state of the vehicle lights to determine whether they are operating properly. In some instances, when the auxiliary lighting system connects into the vehicle lighting system, the vehicle's computer can sense a change in the vehicle lighting system and generate a fault or error. Furthermore, accessing the various wires and connectors of the vehicle lighting system to properly connect into the vehicle lighting system may be difficult and time-consuming.

U.S. Pat. No. 9,751,452 discloses a method and apparatus for installing and operating an auxiliary lighting system using a vehicle light plug, while U.S. Patent Pub. No. 2019/0263316 discloses an auxiliary lighting system that controls the auxiliary lights based on the operational state of the vehicle lights. These patents are incorporated herein by reference in their entireties.

Embodiments of the present invention are directed at improvements over the current state of the art. Embodiments may overcome one or more of the problems outlined above.

BRIEF SUMMARY OF THE INVENTION

Embodiments provide new and improved auxiliary lighting systems for use with auxiliary devices for vehicles and methods of controlling auxiliary lighting systems.

In one aspect, embodiments of the invention provide a light signaling system for a vehicle having a vehicle lighting system and an auxiliary lighting system for use with an auxiliary device. The light signaling system includes a control module mounted to the vehicle. The control module is electrically coupled to one or more lights of the vehicle lighting system of the vehicle and to one or more lights of the auxiliary lighting system. The control module is configured to cause one or more lights, to which it is electrically coupled, to flash on and off.

In a particular embodiment, the light signaling system also includes a switch that is electrically coupled to the control module. The switch is configured to activate and deactivate the light signaling system. Activating the light signaling system causes the one or more lights in the vehicle lighting system and the one or more lights in the auxiliary lighting system to flash on and off. Deactivating the light signaling system causes the one or more lights in the vehicle lighting system and the one or more lights in the auxiliary lighting system to operate in a normal operating mode. In this context, "normal operating mode" refers to how the aforementioned one or more lights in the vehicle lighting system and the one or more lights in the auxiliary lighting system would operate in the absence of the light signaling system.

In a further embodiment, the aforementioned switch is configured to activate the light signaling system by coupling an input of the control module to a power source of the vehicle. The power source may be the main vehicle battery, or may be a secondary vehicle battery. In a particular embodiment, the light signaling system is activated when the input is supplied a voltage. The light signaling system may be configured to operate in a 12-volt system or a 24-volt system. Further, it is envisioned that the claimed invention could be used in vehicles or systems designed to operate at any voltage higher or lower than those mentioned above. With respect to a particular embodiment of the invention, in a 12-volt system, the light signaling system could be activated by an input voltage within a range of 5 to 14 volts.

In a more particular embodiment, the light signaling system is deactivated when the voltage on the input drops below five volts. The connection between the control module and the switch may be wired or, in alternate embodiments, may be wireless. The control module is mounted in an engine compartment under a hood of the vehicle. However, in other embodiments, the control module is mounted in the vehicle cabin.

In certain embodiments, the control module is electrically coupled to front and rear turn signals for the vehicle such that, when the light signaling system is activated, it causes the front and/or rear turn signals to flash on and off. In alternate embodiments, the control module is electrically coupled to the vehicle and auxiliary headlights for the vehicle such that, when the light signaling system is activated, it causes the vehicle and/or auxiliary headlights to flash on and off. In other embodiments, the control module is electrically coupled to turn signals for the auxiliary lighting system such that, when the light signaling system is activated, it causes the auxiliary lighting system turn signals to flash on and off In a further embodiment, the control module interrupts flashing of the front and rear turn signals and the auxiliary lighting system turn signals when the turn signals are operated by a driver, and resumes flashing of the front and rear turn signals and the auxiliary lighting system turn signals when operation of the turn signals by the driver is completed.

The control module may be configured to provide a delay between the time when operation of the turn signals is completed by the driver, and the time when flashing of the front and rear turn signals resumes. That delay could range from one second to five seconds. The control module could also be electrically coupled to a marker light for the vehicle and a marker light for the auxiliary light lighting system such that, when the light signaling system is activated, it causes the marker lights for the vehicle and auxiliary light lighting system to flash on and off. In particular embodiments, the auxiliary device is one of a snow plow, a street sweeping device, and a street washing device.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
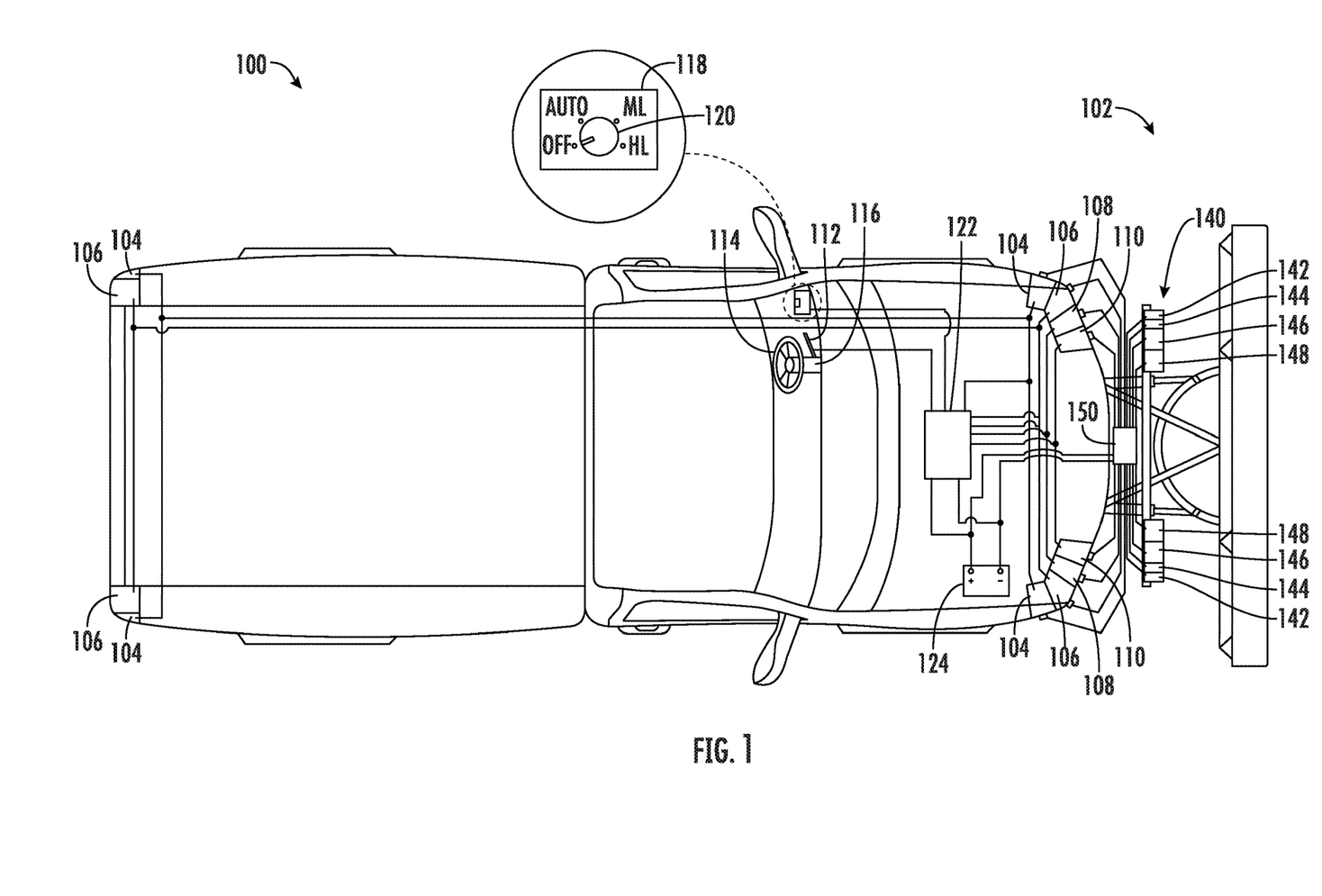
FIG. 1 is a schematic top illustration of a vehicle having an auxiliary device attached and an auxiliary lighting system.

FIG. 1 provides a simplified illustration of a vehicle 100 having an auxiliary device 102 useable with the vehicle 100, and attached to the front of the vehicle 100. In this embodiment, the auxiliary device 102 is a snowplow. However, it is envisioned that other auxiliary devices, such as a sweeper, could be used on vehicle 100. While FIG. 1 shows the vehicle 100 as a pick-up truck, embodiments of the invention allow for the use of other vehicles such as a utility vehicle or a 4-wheeler, for example.

The vehicle 100 includes a vehicle lighting system that may include a plurality of different lights and components and a variety of different configurations. In the illustrated vehicle, the lighting system includes vehicle marker lights 104, vehicle turn signal lights 106, and vehicle headlights that include vehicle high beam lights 108 and vehicle low beam lights 110. It is noted that some of the lights may be combined. For instance, a vehicle marker light and a vehicle turn signal light may be provided by a same light bulb. Such a light bulb may have different filaments for each function or be operated at different intensities or for different amounts of times for different functions.

Further, a vehicle headlight may have a single bulb with different filaments for providing a vehicle high beam light and a vehicle low beam light. Alternatively, a vehicle headlight may be provided by two complete different bulbs with one providing the vehicle high beam light and one providing the vehicle low beam light. Further, a single filament may be provided for the vehicle headlight and the filament is operated at different intensities to provide a vehicle high beam light and a vehicle low beam light.

A vehicle headlight is a light used to provide significant illumination for illuminating the ground in front of the vehicle to assist the user in viewing objects over which the vehicle is driving. A vehicle turn signal light or vehicle marker light shall not be construed to be vehicle headlights. However, individual light bulbs of the vehicle may be operated in different manners to function as a particular light.

The vehicle lighting system also, in this embodiment, includes a manually-operable headlight control 112 for switching operational states of the vehicle headlight. More particularly, the manually-operable headlight control 112 can be used to switch between a high beam mode in which the vehicle high beam lights 108 are activated and a low beam mode in which the vehicle low beam lights 110 are activated. Again, in accordance with different style of headlights, this switching could include deactivating/activating one filament (e.g. a low beam filament or bulb) and activating/deactivating another filament (e.g. a high beam filament or bulb).

Alternatively, this could include leaving a low beam filament/bulb activate at all times and simply toggling a high beam filament/bulb on (high beam mode) and off (low beam mode). Further yet, this could include using a single filament and increasing the power supplied to the filament/bulb to transition from a low beam mode to a high beam mode and reducing the power supplied to the filament/bulb to transition from the high beam mode to a low beam mode. As such, while separate portions are demarcated in the figures for the vehicle high and low lights 108, 110 for ease of illustration, they need not be so configured in operation. This high and low beam features are equally applicable to the auxiliary lighting system 140 described below.

The manually-operable headlight control 112 is typically located proximate the steering wheel 114 and, in some embodiments, is in the form of a stalk that sticks out from the steering column 116. In other embodiments, the manually-operable headlight control 112 can also be used to activate a desired vehicle turn signal light 106.

The vehicle lighting system may also include a manually-operable vehicle light control 118. The manually-operable vehicle light control can control the operational state of the vehicle lighting system. For instance, the manually-operable vehicle light control 118 can have various different operating modes for the vehicle lighting system. In the illustrated embodiment, the manually-operable vehicle light control 118 is a physical knob that can be rotated. However, it could take the form of a virtual selector that can be done by voice command or input using buttons as part of a digital system.

The manually-operable vehicle light control 118 can have an "Off" mode where none of the vehicle lights are activated.

It can have an "Auto" mode where the vehicle lights, such as the vehicle head lights will automatically turn on and off depending on the environmental conditions (e.g. amount of ambient light) in which the vehicle is operating. It can have a "Marker Light" mode (illustrated as an "ML" in FIG. 1) in which the headlights are not activated but marker lights 104 are active. Further, it can have a "Head Light" mode (illustrated as "HL" in FIG. 1) in which the headlights are activated and, depending on the vehicle, the marker lights 104 may or may not be active.

The vehicle lighting system may include a vehicle light controller 122. In the illustrated embodiment, the vehicle light controller 122 is operably connected to the various vehicle lights including the vehicle marker lights 104, vehicle turn signal lights 106, and vehicle headlights that include vehicle high beam lights 108 and vehicle low beam lights 110 by appropriate wiring. The vehicle light controller 122 is also operably connected to the manually-operable headlight control 112 and the manually-operable vehicle light control 118. The vehicle light controller 122 is also operably connected to a power source 124 illustrated in the form of a battery that provides power to the vehicle lighting system to power the various vehicle lights and the vehicle light controller 122.

The vehicle light controller 122 can receive appropriate signals from the manually-operable headlight control 112 and the manually-operable vehicle light control 118 and determine which vehicle lights to properly power. The vehicle light controller 122 may be a plurality of modules (e.g. one for the vehicle headlights, one for the vehicle marker lights and one for the vehicle turn signal lights 106, or any combination thereof).

The vehicle lighting system, typically the vehicle light controller 122, may also include a "flash-to-pass" feature where when the manually-operable vehicle light control 118 is in a mode where the vehicle headlights would normally be deactivated that when the manually-operable vehicle headlight control 112 is manipulated to otherwise change the operational state of the vehicle headlight that a brief amount of power is sent to the vehicle headlight to cause the vehicle headlight to flash. This is often used when a user wants to signal to other vehicle operators that the user is going to make a passing maneuver.

The vehicle light controller 122 will receive a signal from the manually-operable vehicle headlight control 112 that indicates a desire to change the operational state of the vehicle headlight and then cause such a vehicle headlight flash to occur. The flash may be any of the vehicle high beam lights 108, the vehicle low beam lights 110 or a combination thereof. The actuation of the manually-operable vehicle headlight control 112 is switched between fixed positions or is pushed to a different position and then it automatically springs back to its original position.

Embodiments of the invention provide an auxiliary lighting system 140 for use with the auxiliary device 102. The auxiliary lighting system 140 finds particular usefulness in providing auxiliary lighting when the vehicle lights of the vehicle lighting system are otherwise insufficient or blocked by the auxiliary device 102.

In the illustrated embodiment, the auxiliary lighting system 140 includes auxiliary marker lights 142, auxiliary turn signal lights 144, and auxiliary headlights that include auxiliary high beam lights 146 and auxiliary low beam lights 148 (referred to as a group as auxiliary lights 142, 144, 146, 148). The auxiliary lighting system 140 is operably connected to a power source to supply power to the various auxiliary lights. In this embodiment, the auxiliary lighting system 140 directly obtains power from the vehicle power source 124. The power to power the auxiliary lights 142, 144, 146, 148 is not provided by the vehicle lighting system. While this embodiment shares the vehicle battery to power both the vehicle lighting system and the auxiliary lighting system, a second power source could be provided to power the auxiliary lighting system 140.

An auxiliary light controller 150 is operably connected to the auxiliary lights 142, 144, 146, 148 to operably control the operational states of the auxiliary lights 142, 144, 146, 148. The auxiliary light controller 150 includes the appropriate internal circuitry to control power distribution to the auxiliary lights 142, 144, 146, 148 such that they auxiliary lights 142, 144, 146, 148 are appropriately powered and controlled for their desired operation. The auxiliary lights 142, 144, 146, 148 can be mounted to the auxiliary device 102 or could otherwise be mounted to the vehicle 100. Further, the auxiliary light controller 150 could be mounted on the vehicle 100, e.g., under the hood/in the engine compartment of the vehicle 100 or, as illustrated, mounted directly onto the auxiliary device 102.

The auxiliary lighting system 140 is configured to simulate at least one if not all of the lights of the vehicle lighting system so that the vehicle lighting system need not be relied upon when using the auxiliary device 102. This is particularly useful when the auxiliary device 102 obscures or otherwise reduces the effectiveness of the vehicle lights of the vehicle lighting system.

As noted above, due to the changes in complexity of vehicle lighting systems, directly connecting auxiliary lights into the vehicle lighting system can cause undesirable consequences and difficulties. Embodiments of the auxiliary lighting system of the instant invention attempt to overcome or reduce the disadvantages related to prior auxiliary lighting systems.

It is a feature of some embodiments, that the auxiliary lighting system 140 can be activated and controlled by using manually-operable vehicle controls that are part of the vehicle lighting system. More particularly, one or more of the auxiliary lights 142, 144, 146, 148 may be activated and/or manipulated using the manually-operable headlight control 112 and/or the manually-operable vehicle light control 118. Further still, the auxiliary lighting system 140 may be activated using the manually-operable headlight control 112. While not necessary in all embodiments, it is preferred, if the auxiliary lighting system 140 can be implemented without having to electrically connect to any of the vehicle lighting system. Note, the power source shall not be considered part of the vehicle lighting system and thus sharing a same power source, e.g. battery, shall not be considered electrically connecting the auxiliary lighting system 140 to the vehicle lighting system.

To facilitate operation of the auxiliary lighting system 140, the auxiliary lighting system 140 includes a plurality of sensors that sense the operational state of various ones of the vehicle lights. In the embodiment illustrated in FIG. 2, the auxiliary lighting system 140 includes vehicle marker light sensors 160, vehicle turn signal light sensors 162, vehicle head light sensors in the form of vehicle high beam light sensors 164 and vehicle low beam light sensors 166. Each sensor 160, 162, 164, 166 operably senses the operational state of the corresponding vehicle light. Further, each vehicle light sensor 160, 162, 164, 166 operably sends an operational state signal to the auxiliary light controller 150 such that the auxiliary light controller 150 can, at least in part, operably control the operation of the auxiliary lights 142, 144, 146, 148. In the illustrated embodiment, the sensors 160, 162, 164, 166 are wired directly to the auxiliary light controller 150. However, in other embodiments, the vehicle light sensors 160, 162, 164, 166 can wirelessly communicate with the auxiliary light controller 150 using any wireless communication protocol such as Bluetooth, Wi-Fi, infrared, sonar, etc.

One independent feature of the auxiliary lighting system 140 is that the auxiliary lighting system 140 activates upon activation of the vehicle marker lights 104. The auxiliary lighting system 140 is thus configured to activate when auxiliary light controller 150 receives a vehicle marker light operational state signal from one or more of the vehicle marker light sensors 160 that indicates that one or more of the vehicle marker light sensors 160 is active. The reason for activating the auxiliary lighting system based on an active operational state of the vehicle marker light 104 is that, as outlined above, most vehicles include an operational state for the vehicle lighting system in which the marker lights 104 may be active while the vehicle headlights are inactive, except during flash to pass activities. Thus, a user may activate the auxiliary lighting system 140 using controls that are part of the standard vehicle lighting system to activate the auxiliary lighting system 140. More particularly, the user can simply switch the manually-operable vehicle light control 118 to Marker Light mode to activate the auxiliary lighting system 140 without also turning on the vehicle headlights.

With the manually-operable vehicle light control 118 in Marker Light mode, the vehicle marker lights 104 will activate. The activation of the vehicle marker lights 104 will be sensed by the vehicle marker light sensors 160 and a vehicle marker light operational state signal will be sent to the auxiliary light controller 150, and the auxiliary light controller 150 will transition to an active state. In some implementations, activation of the auxiliary light controller 150 upon receipt of the vehicle marker light operational state signal indicating that the vehicle marker light is active will cause the auxiliary light controller 150 to automatically activate the auxiliary headlight, e.g. one or both of the auxiliary high beam light 146 and/or auxiliary low beam light 148.

Figure 2:
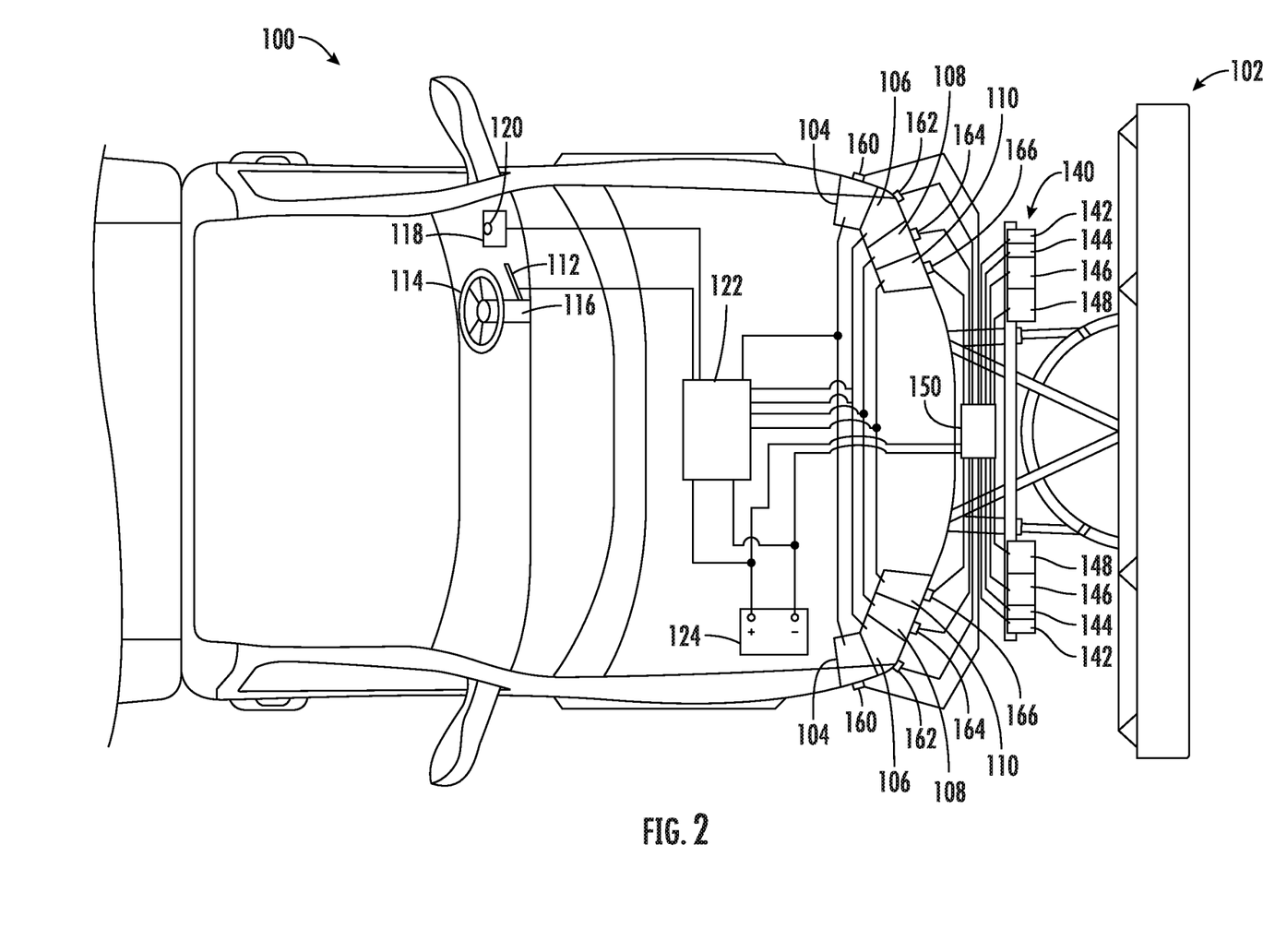
FIG. 2 is an enlarged partial illustration of the vehicle of FIG. 1 including the auxiliary device and auxiliary lighting system.

In the embodiment illustrated in FIG. 2, the vehicle light sensors 160, 162, 164, 166 can be photoelectric devices that sense the intensity of light produced by the corresponding vehicle lights 104, 106, 108, 110. Typically, the vehicle light sensors 160, 162 164, 166 are aimed away from the auxiliary device 102 and toward the corresponding vehicle lights 104, 106, 108, 110. In one implementation, the vehicle light sensors 160, 162, 164, 166 are directly secured to the outer lens of the corresponding vehicle lights 104, 106, 108, 110.

These vehicle light sensors 160, 162, 164, 166 do not electrically connect into the vehicle lighting system. Because these vehicle light sensors 160, 162, 164, 166 do not electrically connect into the vehicle lighting system, the problems outlined above, related to conventional auxiliary lighting systems, do not occur. More particularly, the computer of the vehicle 100 that monitors various operations of the vehicle will not get signals that changes in the vehicle lighting system have occurred nor will there be false signals that a trailer or other device is being towed by the vehicle such that any backup cameras or sensors are deactivated, such as with systems that connect into the trailer plug of a vehicle.

As such, the vehicle marker light sensor 160 will monitor the intensity of the vehicle marker light 104 and send a corresponding vehicle marker light operational state signal to the auxiliary light controller 150. Based on this vehicle marker light operational state signal, the auxiliary light controller 150 will activate or keep deactivated the auxiliary headlights (e.g., send, or not send, power to the auxiliary head lights).

In a particular embodiment, the auxiliary light controller 150 has an auxiliary light control on state wherein at least one of the auxiliary high beam light 146 and the auxiliary low beam light 148 is active and an auxiliary light control off state wherein both of the auxiliary high beam light 146 and the auxiliary low beam light 148 are inactive. The auxiliary light controller 150 switches from the auxiliary light control off state to the auxiliary light control on state upon receipt of a vehicle marker light operational state signal indicating that at least one vehicle marker light 104 is active.

Further, in some implementations, the auxiliary light controller 150 will immediately switch from the auxiliary light control on state to the auxiliary light control off state when the vehicle marker light operational state signal indicates that the vehicle marker light 104 is inactive. Alternatively, in some embodiments, the auxiliary light controller 150 will switch from the auxiliary light control on state to the auxiliary light control off state only after a predetermined amount of time has passed after a vehicle marker light operational state signal indicating that the vehicle marker light 104 is inactive has been received. This can help prevent flickering of the auxiliary headlights and reduce the likelihood of undesirable turning off of the auxiliary headlights.

In some implementations, a further independent feature is that the auxiliary light controller 150 will operably control the auxiliary marker lights 160, e.g., by controlling power thereto, such that the auxiliary marker lights 160 match the operational state of the vehicle marker lights 104.

A further independent feature of some implementations is that the manually-operable controls of the vehicle lighting system can be used to control the auxiliary headlight. More particularly, the user can use the manually-operable headlight control 112 to switch between an auxiliary high beam mode in which the auxiliary high beam light 146 is activated and an auxiliary low beam mode in which the auxiliary low beam light 148 is activated. Typically, in the auxiliary high beam mode, the auxiliary low beam light 148 is deactivated and in the auxiliary low beam mode, the auxiliary high beam light 146 is deactivated.

However, as outlined above for the vehicle headlight, switching between a high beam and low beam may simply be done by leaving the low beam active and activating the high beam function. Alternatively, a change in power may be provided. However, any of these situations can be considered controlling both an operational state of the auxiliary high beam light and the operational state of the auxiliary low beam light. For example, controlling an operational state of the auxiliary high beam and controlling the operational state of the auxiliary low beam light may be increasing/decreasing power to a single filament/bulb, deactivating/activating one filament and activating/deactivating another filament, leaving one filament/bulb active while activating/deactivating a second filament (e.g., leaving the low beam active at all times while toggling the high beam on and off).

More particularly, the auxiliary light controller 150 receives a vehicle headlight operational state signal from the vehicle headlight sensor, illustrated in the form of vehicle high beam light sensors 164 and vehicle low beam light sensors 166 related to the operational state of the vehicle headlights. The auxiliary light controller 150 controls an operational state of the auxiliary high beam light 108 based on the vehicle headlight operational state signal and controls the operational state of the auxiliary low beam light 110 based on the vehicle headlight operational state signal.

When the auxiliary light controller 150 senses a change in the operational state of the vehicle headlight, the auxiliary light controller 150 will also make a change in the operational state of the auxiliary head light. For example, when the auxiliary light controller 150 receives a vehicle headlight operational signal that one or both of the vehicle high beam light 108 and/or the vehicle low beam light 110 has been activated the auxiliary light controller 150 can switch between the auxiliary high beam mode and the auxiliary low beam mode.

Because vehicles are typically equipped with the flash to pass capabilities where the vehicle headlight will activate upon manipulation of the manually-operable headlight control 112 even with vehicle headlight in an inactive state, this flash to pass capability can be used to signal a change in the operational state of the vehicle headlights which is used to trigger a change in the operational state of the auxiliary headlights, e.g., a changing between the auxiliary high beam mode and the auxiliary low beam mode. A significant benefit of this arrangement is that the user is already trained to switch between dims and brights using the same exact control for the vehicle head lights. Further, this avoids requiring a user to find a switch on a separate controller of the auxiliary device to switch between the auxiliary low beam mode and the auxiliary high beam mode, which can cause a user to take their eyes off of their surrounding environment.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Figure 3:
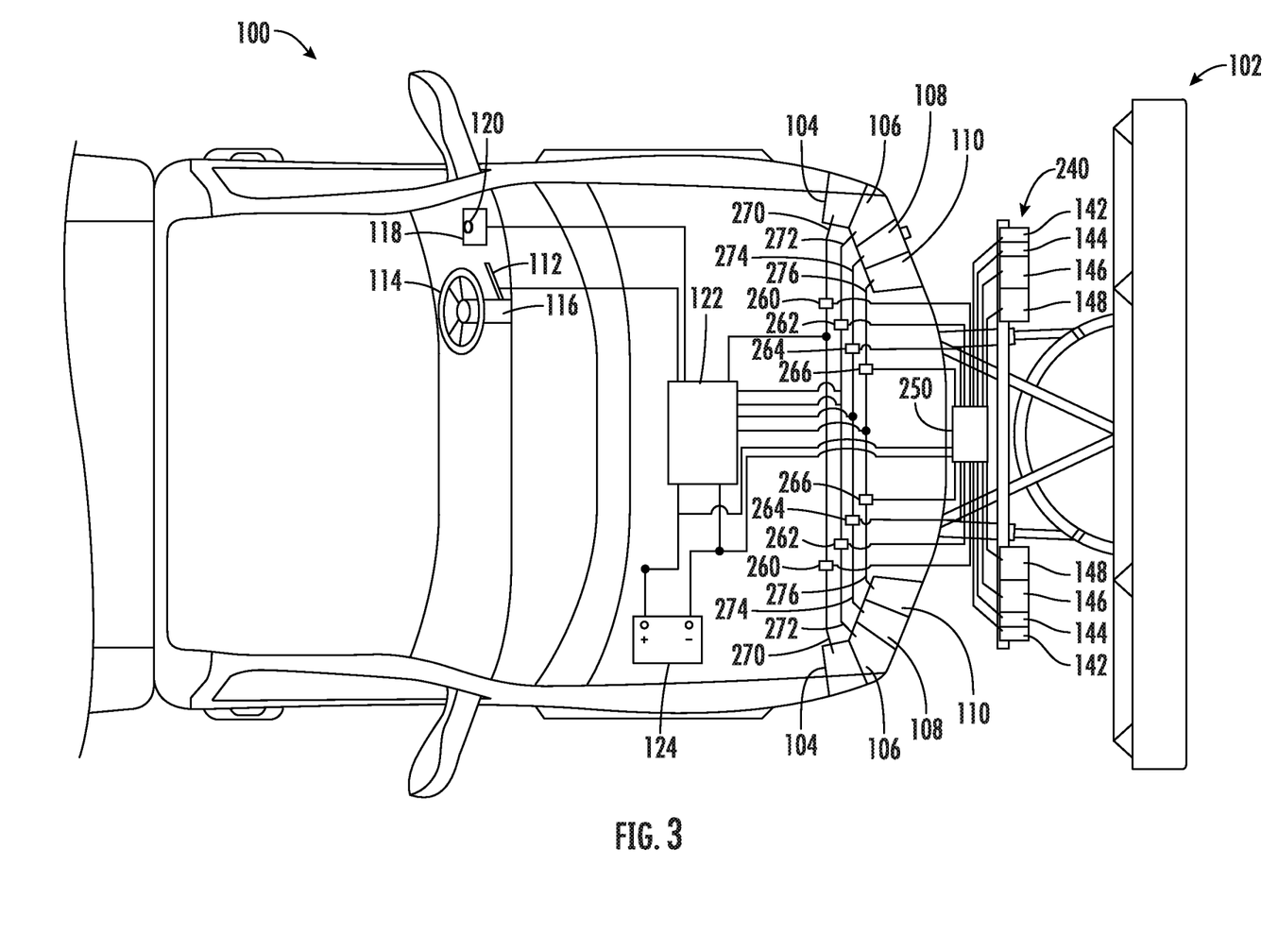
FIG. 3 is an enlarged partial illustration of the vehicle of FIG. 1 including the auxiliary device and an alternative auxiliary lighting system.

FIG. 3 is an enlarged partial illustration of the vehicle 100 of FIG. 1 including the auxiliary device 102 and an alternative auxiliary lighting system 240. The auxiliary lighting system 240 of FIG. 3 includes vehicle marker light sensors 260, vehicle turn signal light sensors 262, vehicle head light sensors in the form of vehicle high beam light sensors 264 and vehicle low beam light sensors 266, again that are operably connected to an auxiliary light controller 250.

Again, the vehicle light sensors 260, 262, 264, 266 do not electrically connect into the vehicle lighting system to avoid the problems outlined above. However, in certain embodiments, the vehicle light sensors 260, 262, 264, 266 are Hall-Effect sensors that sense the magnetic field of a vehicle light wire associated with a corresponding vehicle light 104, 106, 108, 110. More particularly, vehicle marker light sensors 260 sense the magnetic field produced by vehicle marker light wires 270 associated with activating the vehicle marker lights 104 to create a vehicle marker light operational state signal.

Vehicle turn signal light sensors 262 sense the magnetic field produced by vehicle turn signal light wires 272 associated with activating the vehicle turn signal lights 106 to create a vehicle turn signal light operational state signal.

Vehicle high beam light sensors 264 sense the magnetic field produced by vehicle high beam light wires 274 associated with activating the vehicle high beam lights 108 to create a vehicle high beam light operational state signal. Vehicle low beam light sensors 266 sense the magnetic field produced by vehicle low beam light wires 276 associated with activating the vehicle low beam lights 110 to create a vehicle low beam light operational state signal.

More particularly, when power is sent across any of the wires 270, 272, 274, 276, the magnetic field generated thereby will change. This will change the signal sent by the corresponding vehicle light sensors 260, 262, 264, 266 allowing the auxiliary light controller 250 change operation and properly power the desired auxiliary lights. While wires extending between the vehicle light controller 122 and the corresponding vehicle lights 104, 106, 108, 110 are sensed, other wires associated with activating the particular vehicle lights 104, 106, 108, 110 may be sensed. For instance, wires extending between the vehicle light controller 122 and the manually-operable headlight control 112 and the manually-operable vehicle light control 118 may be sensed to produce the appropriate vehicle light operational state signals.

Figure 4:
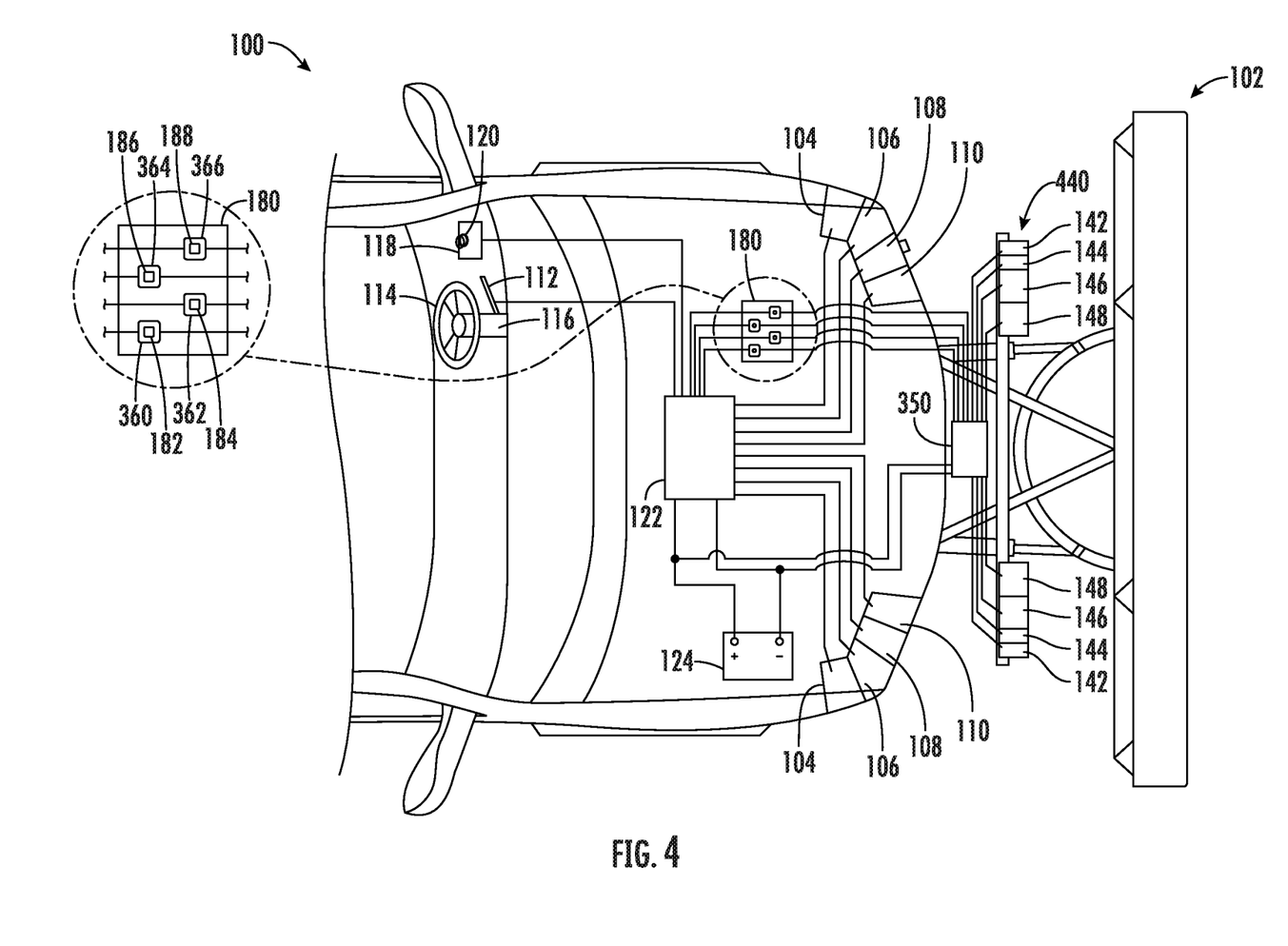
FIG. 4 is an enlarged partial illustration of the vehicle of FIG. 1 including the auxiliary device and an alternative auxiliary lighting system.

FIG. 4 illustrates a further embodiment of an auxiliary lighting system 340 for use with auxiliary device 102. This auxiliary lighting system 340 operates in substantially the same way as the prior auxiliary lighting systems 140, 240. However, in this embodiment, the auxiliary lighting system 340 directly electrically connects into the vehicle lighting system.

In this system, the vehicle lighting system further includes a fuse box 180 that includes a vehicle marker light fuse 182, a vehicle turn signal light fuse 184, one or more vehicle headlight fuses illustrated in the form of a vehicle high beam light fuse 186, and a vehicle low beam light fuse 188.

The auxiliary lighting system 340 includes vehicle marker light sensor 360, vehicle turn signal light sensor 362, vehicle head light sensor in the form of vehicle high beam light sensor 364 and vehicle low beam light sensor 366. These sensors are fuse circuit taps that plug into the slot where the standard fuse plugs into the vehicle lighting system. Here, the corresponding vehicle light operational signals are in the form of electrical current or electrical voltage sensed using the fuse circuit taps. This system electrically connects into the vehicle lighting system, but still overcomes some of the problems with prior systems in that the particular location of the tap may not cause computer errors. The amount of load is so limited that the system 340 does not typically cause computer errors, and it does not plug into trailer plugs that can disable back up cameras or sensors.

A further auxiliary lighting system, not illustrated, uses direct wire taps that pierce through the insulation of wires associated with activating the vehicle lights 104, 106, 108, 110. These direct wire taps directly electrically connect into the vehicle lighting system.

Figure 5:
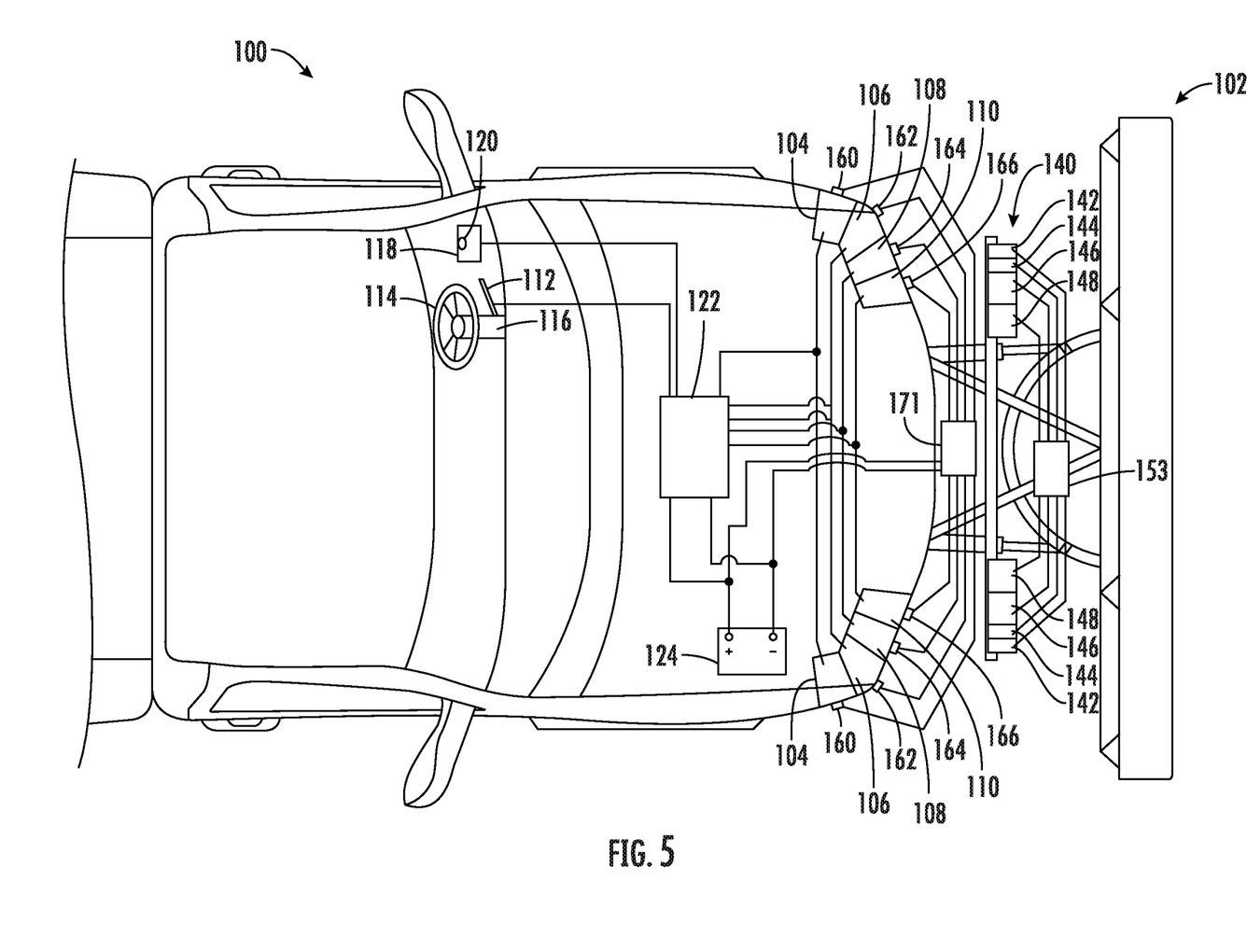
FIG. 5 is an enlarged partial illustration of the vehicle of FIG. 1 including the auxiliary device and an alternative auxiliary lighting system.

FIG. 5 illustrates a further implementation. In this embodiment, there is wireless communication operably between the vehicle light sensors 160, 162, 164, 166 and the auxiliary light controller 153. In this embodiment, a wireless radio 171 sends signals to the auxiliary light controller 153 wirelessly. In alternative embodiments, each vehicle light sensor 160, 162, 164, 166 could include a wireless radio and directly wirelessly communicate with the auxiliary light controller.

The vehicle light controller 122 and auxiliary light controller 150 shall have all necessary microprocessors, storage, communication circuits (e.g. which may include among other things wireless radios and receivers), power control circuitry (e.g. for controlling power to the corresponding auxiliary lights, which may include, among other things, switches and relays) and other electrical devices necessary to perform the required functions thereof. These electrical devices may be in a single module or separated into separate modules. Further, some parts of the controllers may be located on the vehicle 100 while other parts of the controllers may be located on the auxiliary device 102.

Figure 6:
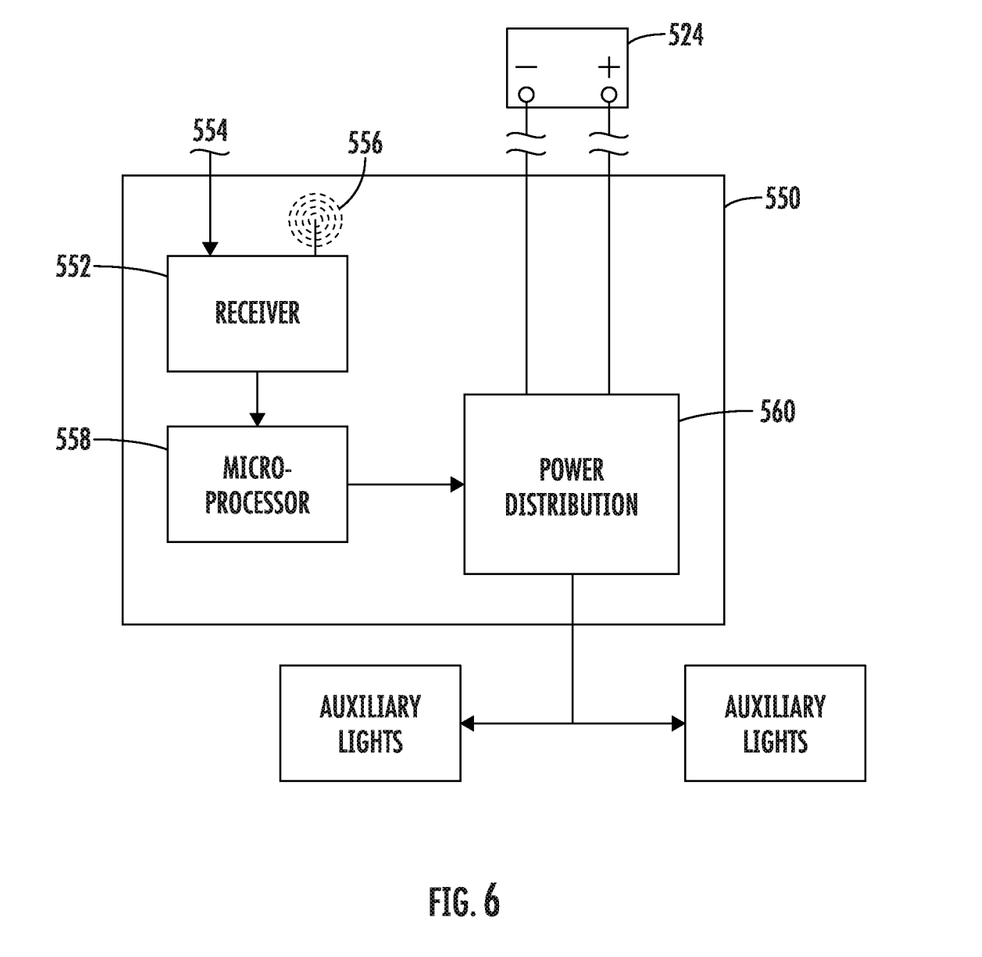
FIG. 6 is a schematic illustration of an auxiliary light controller useable in the auxiliary lighting systems.

FIG. 6 is a schematic representation of an auxiliary light controller 550 usable in one or more of the auxiliary lighting systems described above. The auxiliary light controller 550 includes a receiver 552 configured to receive signals from, one or more of the vehicle light sensors. The receiver 552 may receive the signals via wired connection 554 or wireless communication 556 or a combination thereof.

The receiver 552 communicates the signals to a microprocessor 558. The microprocessor 558 can use the signals to determine how to properly control the various auxiliary lights of the auxiliary lighting system. The microprocessor 558 can then control power distribution circuitry 560 that properly regulates power from a power source 524. Again, the power source 524 could be the standard power source 124 provided by a vehicle 100 (e.g. the battery) or alternatively could be a dedicated power source provided for the auxiliary lighting system. However, such a dedicated power source could be recharged using the standard vehicle electrical system (e.g., an alternator).

The power distribution circuitry 560 could be provided by appropriate switches, relays, transistors, field-effect transistors, etc. In some embodiments, the auxiliary light controller 550 does not require a microprocessor. For example, the signals sent from the vehicle light sensors can be used by the power distribution circuitry 560 to adjust the power supplied to the various auxiliary lights, such as by way of appropriately wired switches, relays, transistors, field-effect transistors, etc.

Figure 7:
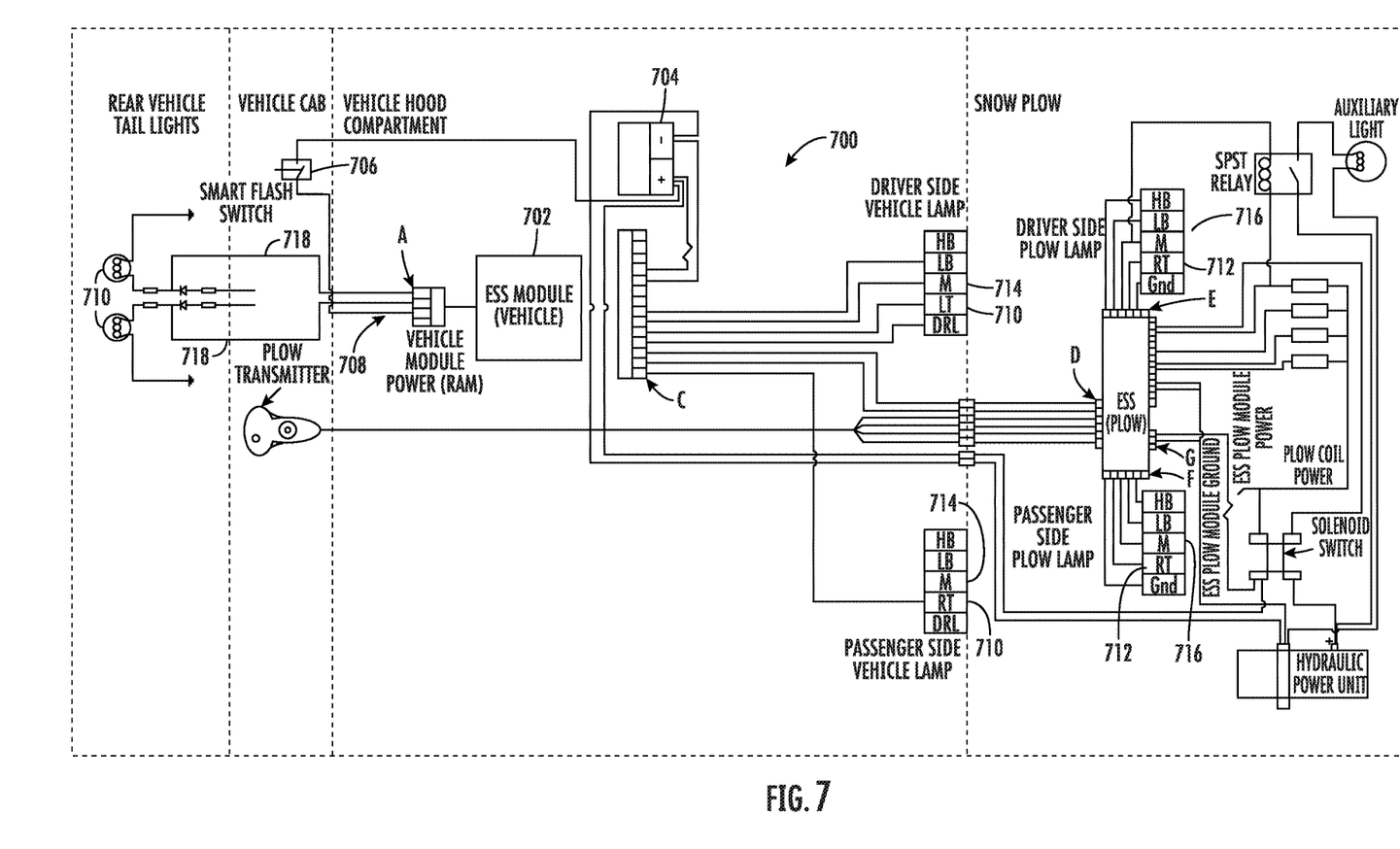
FIG. 7 is a schematic circuit diagram for the light signaling system, in accordance with an embodiment of the invention.

FIG. 7 is a schematic circuit diagram illustrating a light signaling system 700, constructed in accordance with an embodiment of the invention. The light signaling system 700 is for a vehicle 100 (see FIGS. 1-4) with a vehicle lighting system, and for an auxiliary lighting system used with an auxiliary device 102. In particular embodiments, the auxiliary device 102 (see FIGS. 1-4) is one of a snow plow, a street sweeping device, and a street washing device.

As shown in FIG. 7, the light signaling system 700 includes an electronic control module 702 configured to operate the lights of based on the position of the auxiliary device 102 and the operational state of the auxiliary lighting system. In a particular embodiment of the invention illustrated in FIG. 7, the light signaling system 700 uses power and ground supplied from the vehicle 100 to operate. Power may be supplied by the vehicle's main battery 704 or by a secondary battery used to power auxiliary systems on the vehicle 100.

Embodiments of the light signaling system 700 represent an advancement over conventional systems. In many conventional systems, the vehicle user has to modify the vehicle, for example by drilling holes in the headlights to install flashers, add an auxiliary hazard beacon onto the vehicle roof, or, alternatively, to purchase an expensive OBD2 (on-board diagnostics II) plugin for the vehicle 100. In contrast to conventional systems, the light signaling system 700 does not call for extensive vehicle modifications as it utilizes the lighting system already on the vehicle 100 and auxiliary device 702. Thus, the light signaling system 700 disclosed herein is able to enhance visibility of the vehicle 100 when plowing, cleaning, sweeping, etc. with out the invasiveness that conventional flasher kits require.

As stated above, the light signaling system 700 includes a control module 702 mounted to the vehicle 100. The control module 702 may be mounted in an engine compartment under a hood of the vehicle 100. However, in other embodiments, the control module 702 is mounted in the vehicle cabin. The control module 702 is electrically coupled to one or more lights of the vehicle lighting system of the vehicle 100 and to one or more lights of the auxiliary lighting system. The control module 702 is configured to cause the one or more lights, to which it is electrically coupled, to flash on and off.

In particular embodiments, the control module 702 is a microprocessor programmed with software to carry out the functions described in more detail below. In a more particular embodiment, the light signaling system 700 includes a switch 706 that is electrically coupled to the control module 702. The switch 706 is configured to activate or deactivate the light signaling system 700. Activating the light signaling system 700 causes the one or more lights in the vehicle lighting system and the one or more lights in the auxiliary lighting system to flash on and off. Deactivating the light signaling system 700 causes the one or more lights in the vehicle lighting system and the one or more lights in the auxiliary lighting system to operate in a normal operating mode.

In this context, "normal operating mode" refers to how the aforementioned one or more lights in the vehicle lighting system and the one or more lights in the auxiliary lighting system would operate in the absence of the light signaling system 700. That is, normal operating mode refers to the normal, or typical, conventional operation of the vehicle and auxiliary lighting systems by the driver.

The aforementioned switch 706 may be configured to activate the light signaling system 700 by coupling an input 708 of the control module 706 to a power source 704 of the vehicle 100. The power source 704 may be the main vehicle battery, or may be a secondary vehicle battery. In a particular embodiment, the light signaling system 700 is activated when the input 708 is supplied a voltage. The light signaling system 700 may be configured to operate in a 12-volt system or a 24-volt system, which are commonly used in vehicles. Further, it is envisioned that the light signaling system 700 could be used in vehicles or systems designed to operate at any voltage higher or lower than those mentioned above. With respect to a particular embodiment of the invention, in a 12-volt system, the light signaling system 700 could be activated by an input voltage within a range of 5 to 14 volts.

In a more particular embodiment, the light signaling system 700 is deactivated when the switch 706 severs the electrical connection between the input 708 and the power source or battery 704, and the voltage on the input 708 drops below five volts. The connection between the control module 702 and the switch 706 may be wired as shown in FIG. 7 or, in alternate embodiments, may be wireless. In certain embodiments, the control module 702 is electrically coupled to front and rear turn signals 710 for the vehicle 100 such that, when the light signaling system 700 is activated, it causes the front and/or rear turn signals 710 to flash on and off. In alternate embodiments, the control module 702 is electrically coupled to the vehicle and auxiliary headlights for the vehicle 100 such that, when the light signaling system 700 is activated, it causes the vehicle and/or auxiliary headlights to flash on and off.

In other embodiments, the control module 702 is electrically coupled to turn signals 712 for the auxiliary lighting system such that, when the light signaling system 700 is activated, it causes the auxiliary lighting system turn signals 712 to flash on and off. In a further embodiment, the control module 702 interrupts flashing of the front and rear turn signals 710 and the auxiliary lighting system turn signals 712 when the turn signals 710, 712 are operated by a driver, and resumes flashing of the front and rear turn signals 710 and the auxiliary lighting system turn signals 712 when operation of the turn signals 710, 712 by the driver is completed. Thus, the control module 702 controls the auxiliary lighting system turn signals 712 and supplies power to the left and right rear turn wires 718, as shown in FIG. 7. In certain embodiments, the left and right rear turn wires 718 are spliced into the electrical lines for the rear turn signal 710 of the vehicle 100.

In certain embodiments of the invention, the control module 702 may be configured to provide a delay between the time when operation of the turn signals 710, 712 is completed by the driver, and the time when flashing of the turn signals 710, 712 resumes. That delay could range from one second to five seconds. The control module 702 could also be electrically coupled to a marker light 714 for the vehicle and a marker light 716 for the auxiliary light lighting system such that, when the light signaling system 700 is activated, it causes the marker lights 714, 716 on the vehicle 100 and on the auxiliary light lighting system to flash on and off.

To provide an example of the light signaling system 700 in operations, when the system 700 is activated via the switch 706, the auxiliary lighting system turn signals 712 will double flash alternately with the rear turn signals 710 on the vehicle 100. For example, the left auxiliary lighting system turn signal 712 and right vehicle turn signal 710 will flash twice in one second, then the right auxiliary lighting system turn signal 712 and left vehicle turn signal 710 will flash twice in one second. This will continue until the system 700 is deactivated via the switch 706, or the turn signals for the vehicle 100 are operated by the driver. If the vehicle's turn signals 710 are operated by the driver, the alternate flashing will cease until the vehicle's turn signals 710 have stopped operating. As indicated above, there may be a preset delay between the time vehicle's turn signals 710 stop operating and the time that flashing resumes.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A light signaling system for a vehicle having a vehicle lighting system and an auxiliary lighting system for use with an auxiliary device, the light signaling system comprising:
   a control module mounted to the vehicle, the control module electrically coupled to one or more lights of the vehicle lighting system of the vehicle and to one or more lights of the auxiliary lighting system, the control module being configured to cause one or more lights, to which it is electrically coupled, to flash on and off; and
   a switch electrically coupled to the control module, the switch configured to activate and deactivate the light signaling system, wherein activating the light signaling system causes the one or more lights in the vehicle lighting system and the one or more lights in the auxiliary lighting system to flash on and off;
   wherein the connection between the control module and switch is wireless.

2. The light signaling system of claim 1, wherein deactivating the light signaling system causes the one or more lights in the vehicle lighting system and the one or more lights in the auxiliary lighting system to operate in a normal operating mode.

3. The light signaling system of claim 1, wherein the switch is configured to activate the light signaling system by coupling an input of the control module to a power source of the vehicle.

4. The light signaling system of claim 3, wherein the power source is a main vehicle battery.

5. The light signaling system of claim 3, wherein the power source is a secondary vehicle battery.

6. The light signaling system of claim 1, wherein the control module is mounted in an engine compartment under a hood of the vehicle.

7. The light signaling system of claim 1, wherein the control module is electrically coupled to front and rear turn signals for the vehicle such that, when the light signaling system is activated, it causes the front and/or rear turn signals to flash on and off.

8. The light signaling system of claim 7, wherein the control module is electrically coupled to turn signals for the auxiliary lighting system such that, when the light signaling system is activated, it causes the auxiliary lighting system turn signals to flash on and off.

9. The light signaling system of claim 8, wherein the control module interrupts flashing of the front and rear turn signals and the auxiliary lighting system turn signals when the turn signals are operated by a driver, and resumes flashing of the front and rear turn signals and the auxiliary lighting system turn signals when operation of the turn signals by the driver is completed.

10. The light signaling system of claim 9, wherein the control module is configured to provide a delay between the time when operation of the turn signals is completed by the driver, and the time when flashing of the front and rear turn signals resumes.

11. The light signaling system of claim 10, wherein the delay ranges from one second to five seconds.

12. The light signaling system of claim 1, wherein the control module is electrically coupled to a marker light for the vehicle and a marker light for the auxiliary light lighting system such that, when the light signaling system is activated, it causes the marker lights for the vehicle and auxiliary light lighting system to flash on and off.

13. The light signaling system of claim 1, wherein the auxiliary device is one of a snow plow, a street sweeping device, and a street washing device.

14. The light signaling system of claim 1, wherein the control module is mounted in a passenger cabin of the vehicle.

15. The light signaling system of claim 1, wherein the control module is electrically coupled to headlights for the vehicle and for the auxiliary device such that, when the light signaling system is activated, it causes the headlights for the vehicle and/or auxiliary device to flash on and off.

16. A light signaling system for a vehicle having a vehicle lighting system and an auxiliary lighting system for use with an auxiliary device, the light signaling system comprising:
- a control module mounted to the vehicle, the control module electrically coupled to one or more lights of the vehicle lighting system of the vehicle and to one or more lights of the auxiliary lighting system, the control module being configured to cause one or more lights, to which it is electrically coupled, to flash on and off; and
- a switch electrically coupled to the control module, the switch configured to activate and deactivate the light signaling system, wherein activating the light signaling system causes the one or more lights in the vehicle lighting system and the one or more lights in the auxiliary lighting system to flash on and off;
- wherein the switch is configured to activate the light signaling system by coupling an input of the control module to a power source of the vehicle; and
- wherein the light signaling system is activated when the input is supplied a voltage within a range of 5 to 14 volts.

17. A light signaling system for a vehicle having a vehicle lighting system and an auxiliary lighting system for use with an auxiliary device, the light signaling system comprising:
- a control module mounted to the vehicle, the control module electrically coupled to one or more lights of the vehicle lighting system of the vehicle and to one or more lights of the auxiliary lighting system, the control module being configured to cause one or more lights, to which it is electrically coupled, to flash on and off; and
- a switch electrically coupled to the control module, the switch configured to activate and deactivate the light signaling system, wherein activating the light signaling system causes the one or more lights in the vehicle lighting system and the one or more lights in the auxiliary lighting system to flash on and off;
- wherein the switch is configured to activate the light signaling system by coupling an input of the control module to a power source of the vehicle; and
- wherein the light signaling system is deactivated when the voltage on the input drops below five volts.

* * * * *